(12) United States Patent
Iversen

(10) Patent No.: US 10,525,441 B2
(45) Date of Patent: Jan. 7, 2020

(54) MODULAR PROCESSING SYSTEM

(71) Applicant: Steeper Energy ApS, Hørsholm (DK)

(72) Inventor: Steen Brummerstedt Iversen, Vedbæk (DK)

(73) Assignee: STEEPER ENERGY APS, Hørsholm (DK)

( * ) Notice: Subject to any disclaimer, the term of this patent is extended or adjusted under 35 U.S.C. 154(b) by 0 days.

(21) Appl. No.: 16/185,886

(22) Filed: Nov. 9, 2018

(65) Prior Publication Data

US 2019/0134597 A1    May 9, 2019

(30) Foreign Application Priority Data

Nov. 9, 2017   (DK) ................................. 2017 70842

(51) Int. Cl.
  *C10G 65/14*      (2006.01)
  *B01J 19/24*      (2006.01)
  *B01J 19/00*      (2006.01)

(52) U.S. Cl.
  CPC ....... *B01J 19/2445* (2013.01); *B01J 19/0013* (2013.01); *B01J 2219/00087* (2013.01); *B01J 2219/00162* (2013.01)

(58) Field of Classification Search
  CPC .... C10G 65/14; B01J 19/2445; B01J 19/0013
  USPC ....................................................... 422/187
  See application file for complete search history.

(56) References Cited

U.S. PATENT DOCUMENTS

| | | | |
|---|---|---|---|
| 4,341,234 A | * | 7/1982 | Meinass .............. F17C 7/00 137/110 |
| 4,789,528 A | | 12/1988 | Owen et al. |
| 6,172,275 B1 | | 1/2001 | Tadauchi et al. |
| 2013/0205652 A1 | | 8/2013 | Humphreys et al. |
| 2015/0267128 A1 | | 9/2015 | Jarlsjo et al. |
| 2016/0091901 A1 | | 3/2016 | Iversen |

(Continued)

FOREIGN PATENT DOCUMENTS

| WO | WO 03/063998 A1 | 8/2003 |
|---|---|---|
| WO | WO 2009/015409 A1 | 2/2009 |

(Continued)

OTHER PUBLICATIONS

International Search Report and Written Opinion of the International Searching Authority (formS PCT/ISA/220, PCT/ISA/210 and PCT/ISA/237) for International Application No. PCT/EP2018/080748 dated Jan. 21, 2019.

(Continued)

*Primary Examiner* — Huy Tram Nguyen
(74) *Attorney, Agent, or Firm* — Birch, Stewart, Kolasch & Birch, LLP.

(57) ABSTRACT

The invention relates to a processing system comprising at least one pressurization device; at least one separation device; at least one conversion section; at least one valve unit between the at least one pressurization device and the at least one conversion part; at least one valve unit between the at least one conversion part and the at least one separation unit; where the conversion section comprises at least two parallel conversion units; where each conversion unit comprises at least one heating device, at least one reactor device, and at least one cooling device.

20 Claims, 10 Drawing Sheets

(56) References Cited

U.S. PATENT DOCUMENTS

| | | | |
|---|---|---|---|
| 2016/0101666 A1* | 4/2016 | Sugimura | B60H 1/00899 |
| | | | 165/202 |
| 2016/0318499 A1* | 11/2016 | Yamanaka | B60W 10/06 |
| 2016/0333273 A1 | 11/2016 | Iversen | |
| 2017/0073586 A1 | 3/2017 | Iversen et al. | |

FOREIGN PATENT DOCUMENTS

| | | | |
|---|---|---|---|
| WO | WO 2012/167789 A2 | 12/2012 | |
| WO | WO 2014/032671 A1 | 3/2014 | |
| WO | WO-2015092773 A1 * | 6/2015 | C10G 1/02 |
| WO | WO 2018/011139 A1 | 1/2018 | |

OTHER PUBLICATIONS

Nag, "Distillation and Hydrocarbon Processing Practises". Distillation and Hydrocarbon Processing Practises; Jul. 15, 2015, pp. 499-499.

* cited by examiner

MODULAR PROCESSING SYSTEM

FIELD OF THE INVENTION

The present invention relates to the area of processing systems, in particular systems for use in high pressure continuous processing.

BACKGROUND OF THE INVENTION

Numerous applications of high pressure continuous processes exist or are under development or in early stages of commercialization. Examples of such processes are hydrothermal and solvothermal processes e.g. for production of hydrocarbons such as transportation fuels, lubricants or specialty chemicals, gases, carbonized products or nanomaterials.

In connection with continuously operating such high pressure process systems the temperature must be increased and further must be decreased at the end of the process and for this purpose a number of solutions have been suggested.

Typically, such processes operate at temperatures near the critical point of water and generally involve heating a feed mixture and cooling the product mixture. In order to achieve the heating and cooling in the process, devices for performing the heating and cooling must be provided as part of the high and pressure high temperature systems. Such systems are sensitive in relation to the possible precipitation or even occlusion by the matter being treated in the process. The system may further be subject to service and maintenance activities that will influence the availability of the system.

For that reason, there is a desire to improve the systems in a manner where the availability of the system is increased.

Objective of the Invention

The object of the present invention is to therefore provide for a system as well as a method of operating such system that increases the availability of the high pressure process system, while at the same time lowering the complexity of the system.

DESCRIPTION OF THE INVENTION

According to one aspect of the present invention the objective of the invention is achieved through a processing system comprising
  at least one pressurization device;
  at least one separation device;
  at least one conversion section;
  at least one valve unit between the at least one pressurization device and the at least one conversion part;
  at least one valve unit between the at least one conversion part and the at least one separation unit;
  where the conversion section comprises at least two parallel conversion units;
  where each conversion unit comprises
    at least one heating device
    at least one reactor device, and
    at least one cooling device.

By arranging a number of parallel conversion units, it is possible to adapt the construction to an increased availability, as the non-availability of individual units will not influence the overall availability by more than the contribution from the individual unit itself.

Further, due to the modular construction of the processing system as defined it will be possible to manufacture the components from standardized materials and with less material consumption and hence be possible to achieve a more cost effective production compared to a construction where only one string is used.

In an embodiment a closure valve unit is provided between the at least one pressurization device and each of the conversion units; and where an additional closure valve unit is provided between each of the conversion units and the at least one separation unit. Hereby valve units in high temperature high pressure positions are avoided, which makes the valve units more economical.

In a further embodiment for at least one, preferably for each of the closure valves an additional maintenance valve such as an on/off valve between the two closure valves may be provided, so as to ensure that the conversion unit between the two close valve can be made pressure less by closing the two closure valves and opening the maintenance valve( ), while the remaining parallel conversion units are kept in operation. Hereby it is obtained that a conversion unit be safely taken out of operation for service and/or maintenance, while the remaining conversion units are still operating. Hereby the availability of the total plant is improved.

In this embodiment, it will be possible to seal an individual unit so as to perform maintenance and repair work on an individual unit without shutting down the entire system and hence further increase the availability of the system.

In an embodiment, a pressure reduction device is provided as part of a conversion unit.

By providing a larger number of parallel units, the downtime of a single unit will not affect the total capacity significantly. If e.g. 10 parallel units were in operation, the decoupling of a single unit would only mean a reduction in capacity by 10%.

BRIEF DESCRIPTION OF THE DRAWINGS

The invention will in the following be described with reference to one embodiment illustrated in the drawings where.

PREFERRED EMBODIMENTS

Figure 1A:
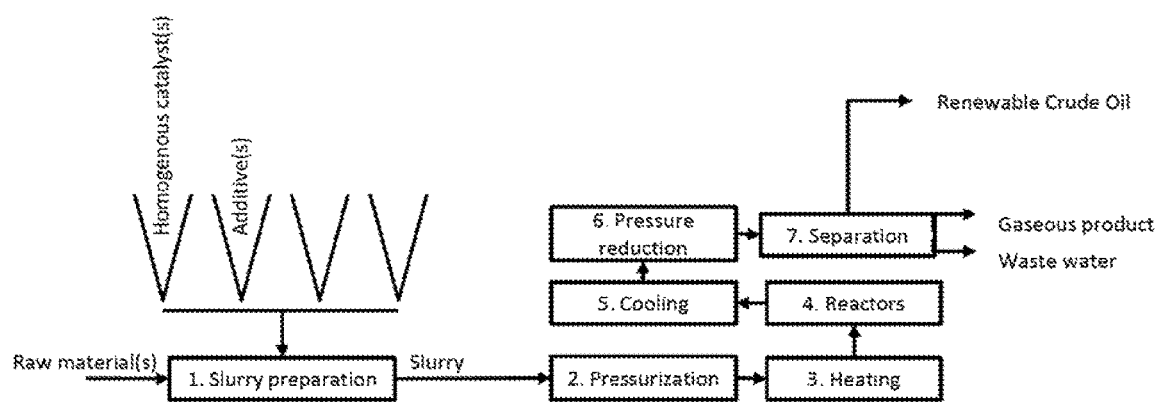
FIGS. 1A and 1B shows a schematic overview of a continuous high pressure process for transforming carbonaceous materials into renewable hydrocarbons.
Figure 1B:
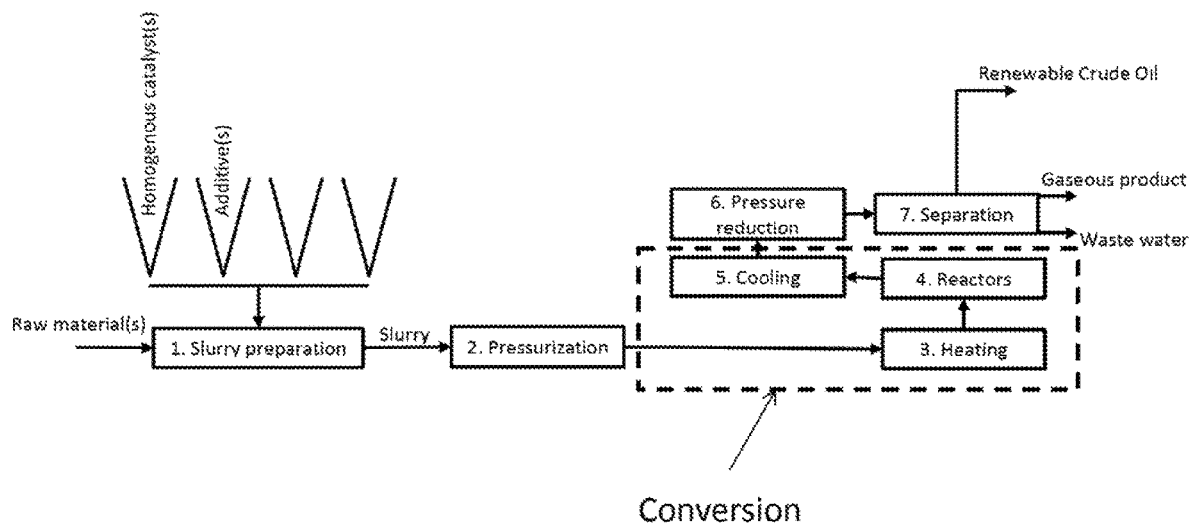

FIG. 1 shows an embodiment of a continuous high pressure production process for conversion of carbonaceous materials such as biomass to renewable oil comprising pumping means and pressurization means.

As shown on FIG. 1, the carbonaceous material is first subjected to a feed mixture preparation step (1). The feed mixture preparation step transforms the carbonaceous material into a pumpable feed mixture and often includes mechanical means for size reduction of the carbonaceous and slurrying the carbonaceous material with other ingredients such as water, catalysts and other additives such as organics in the feed mixture. In a preferred embodiment of the present invention, the feed mixture may be preheated in the pretreatment step. Often the feed mixture is preheated to a temperature in the range from about 150° C.° C. to about 250° C. in the pretreatment step such as temperature in the range from about 150° C. to about 220° C. Preferably, the feed mixture is preheated to a temperature in the range from about 160° C. to about 200° C. such as in the range from about 160° C. to about 180° C.

Advantageously this is performed by transferring heat from the high pressure water cooler via a heat transfer medium such as hot oil or steam, whereby the overall heat recovery and energy efficiency are increased.

The second step is a pressurization step (2) where the feed mixture is pressurized by pumping means to a pressure of at least 150 bar and up to about 450 bar such as a pressure of least 180 bar and up to 400 bar; preferably the feed mixture is pressurized by pumping means to a pressure above the critical point of water such as a pressure of least 250 bar; more preferably the feed mixture is pressurized by pumping means to a pressure of at least 300 bar such as at least 320 bar.

The pressurized feed mixture is subsequently heated to a reaction temperature in the range from about 300° C. and up to about 450° C., such as a temperature in the range from about 340° C. to about 430° C.; preferably the pressurized feed mixture is subsequently heated to a reaction temperature in the range from about 370° C. and up to about 425° C., such a temperature in the range from about 390° C. to about 420° C.

The feed mixture is generally maintained at these conditions in sufficient time for conversion of the carbonaceous material e.g. for a period of 2 to 30 minutes, such as in the range 3 to 20 minutes; and preferably in the range 5 to 15 minutes, before it is cooled and the pressure is reduced.

The product mixture comprising liquid hydrocarbon product, water with water soluble organics and dissolved salts, gas comprising carbon dioxide, hydrogen, and methane as well as suspended particles from said converted carbonaceous material is subsequently cooled to a temperature in the range 80° C. to 250° C. such as in the range 120° C. to 170° C.;

The cooled product mixture thereafter enters a pressure-reducing device. Suitable pressure reduction devices include pressure reduction devices comprising a number of tubular members in a series and/or parallel arrangement with a length and internal cross section adapted to reduce the pressure to desired level, and pressure reducing devices comprising pressure reducing pump units.

The converted feed mixture is further separated into at least a gas phase, a renewable crude oil phase, a water phase with water-soluble organic compounds as well as dissolved salts and eventually suspended particles.

The separation may be performed by gravimetric phase separation or other suitable means such as centrifugation.

Many embodiments of continuous high processing of carbonaceous material to hydrocarbons include a recovery step for recovering homogeneous catalyst and The renewable crude oil may further be subjected to upgrading the process where it is pressurized to a pressure in the range from about 20 bar to about 200 bars such as a pressure in the range 50 to 120 bar, before being heated to a temperature in the range 300° C. to 400° C. in one or more steps and contacted with hydrogen and heterogeneous catalyst(s) contained in one or more reaction zones, and eventually fractionated into different boiling point fractions.

Figure 2:
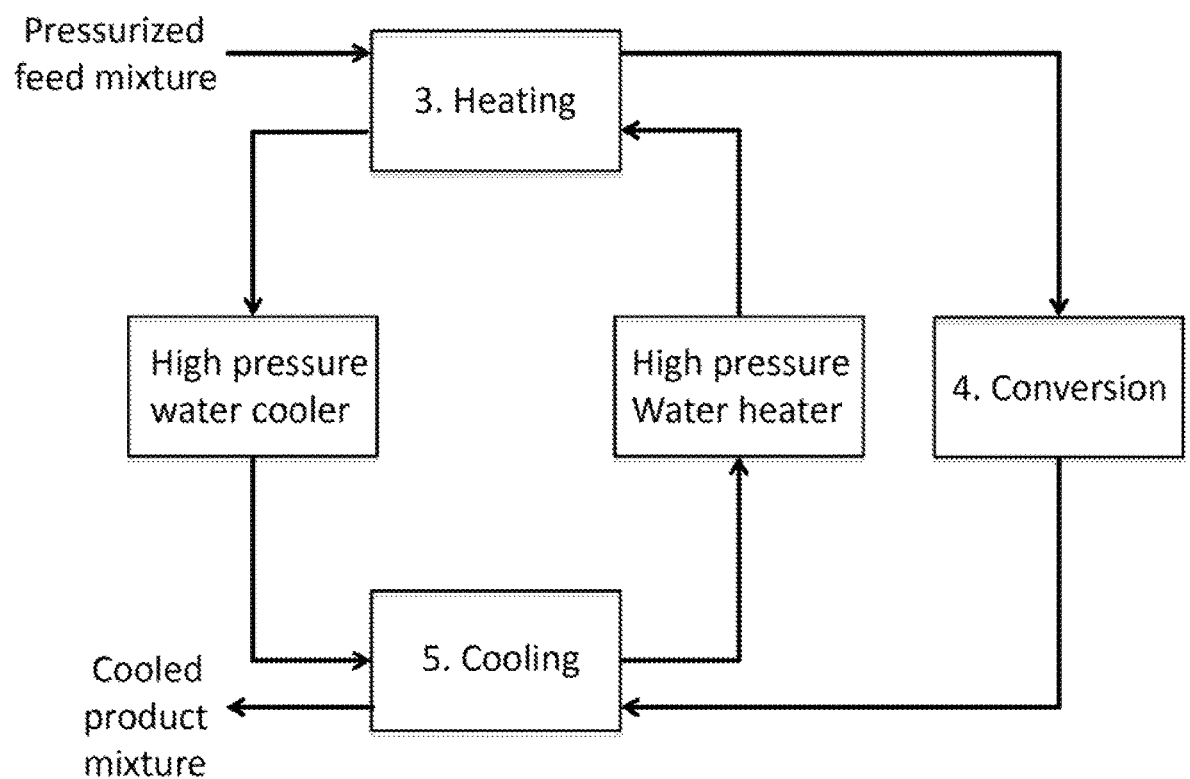
FIG. 2 shows a schematic overview of a first embodiment of a heating and cooling system.

FIG. 2 shows a schematic overview of a first embodiment of a heating and cooling system, where heat is extracted from the cooling step of the product mixture from the conversion step (4) and transferred to the feed mixture heating step (3) using high pressure water at a pressure above the critical pressure as heat transfer medium. The high pressure water from the cooler (5) is further heated prior to entering the feed mixture heater (3), and the cooled high pressure water from the feed mixture heater is further cooled in the high pressure water cooler, before entering the product cooler (5).

In many embodiments both the feed mixture and the product mixture is considered as difficult fluids e.g. being fluids posing a fouling and/or deposition risk and may require periodic cleaning. Hence, an advantageous embodiment of the present invention is where both the feed mixture heater (3) and the product cooler (5) is a shell and tube heat exchangers with the process media flowing inside the tube and the high pressure water flowing om the shell side of the tubes. Hereby, the fluid flows can be better controlled and dead zones being minimized. Further the inner side of the tubes are more easily cleaned than the shell side e.g. by mechanical and/or means.

The flow area for the feed mixture of the first part of the feed mixture heater (3), where the viscosity of the feed mixture may be high may be larger than in the subsequent part of the feed mixture heater (3) so as to minimize the pressure drop over the first part of the feed mixture heater. Hence, an embodiment of the present invention is, where the ratio of the flow area for the feed mixture in the first part of the feed mixture heater to flow area for the feed mixture in the subsequent part is at least 2, such as at least 4.

The flow area may for the feed mixture be changed by using more tubes of same dimensions in parallel or may be changed by changing the inner tube diameter. An advantageous embodiment of the present invention is where the inner diameter of tubes in the first part of the feed mixture heater (3) to inner diameter of the tubes in the subsequent part is at least 1.5 such as a ratio of at least 2.

In many applications, the temperature of feed mixture exiting the first part of feed mixture heater is at least 160° C. such as at least 170° C. Preferably, the temperature of feed mixture exiting the first part of feed mixture heater is at least 180° C. such as at least 190° C.

The average flow velocity of the feed mixture (defined as volume flow divided by the flow area) in the second part of the feed mixture heater is typically at least 1 m/s such as at least 1.5 m/s. Preferably the average flow velocity of the feed mixture (defined as volume flow divided by the flow area) in the second part of the feed mixture heater is at least 2 m/s such as at least 2.5 m/s.

The inlet feed mixture temperature to the feed mixture heater is typically in the range from about 20° C. to about 250° C. such as in the range from about 60° C. to about 220°

C.; preferably the inlet feed mixture temperature to the feed mixture heater is in the range from about 80° C. to about 200° C. such as from about 120° C. to about 180° C.

The feed mixture is typically heated to a temperature of at least 340° C. by the high pressure water such as a temperature of at least 350° C.; preferably the feed mixture is heated to a temperature of at least 370° C. by the high pressure water such as a temperature of at least 390° C.; More preferably the feed mixture is heated to a temperature in the range from about 390° C. to about 425° C. by the high pressure water such as a temperature in the range 395° C. to about 420° C.

The temperature of the high pressure water entering the feed mixture heating step (3) is generally at supercritical conditions such as at a temperature of least 400° C. before entering the feed mixture heater (3); preferably the temperature of the high pressure water is at least 420° C. such as at least 430° C.; more preferably the temperature of the high pressure water is at least 440° C. such as at least 450° C.

The high pressure water exiting the feed mixture heating step (3) is typically at supercritical conditions such as at a temperature of least 150° C. before exiting the feed mixture heater (3); preferably the temperature of the high pressure water exiting the feed mixture heating step (3) is at least 150° C. such as at least 200° C.; more preferably the temperature of the high pressure water the feed mixture heating step (3) is at least 230° C. such as at least 250° C.

The high pressure water exiting the feed mixture heater (3) is further cooled in the high pressure water cooler, before entering the product cooler (5). Typically the cooling of the high pressure water exiting the feed mixture heater (3) in the high pressure cooler is performed by heat transfer to a heat transfer medium such as hot oil. The heat extracted in the high pressure water cooler may be distributed to other parts of the process via the heat transfer medium as shown and described in further details in relation to FIG. 5.

Several advantages are provided by the high pressure water cooler:

- The surface temperature of the heat transfer area in the product cooler (5) can be maintained at and controlled to a sufficiently high temperature so as to prevent solidification of high boiling compounds on the heat transfer surfaces without sacrificing the overall heat recovery. In many embodiments of the present invention such solidification of high boiling compounds may cause fouling of heat transfer surfaces and/or clogging of heat transfer tubes and/or a reduced on stream factor.
- The heat transfer area required in the product cooler (5) is significantly reduced due to a higher temperature driving force due to further cooling and heat recovery by the high pressure water cooler
- The high pressure water cooler provides an option to fine tune or to trim the operation of the product cooler (5).

Subsequent to the high pressure water cooler the high pressure water enters the product cooler on the shell side of the tubes.

Typically, the inlet temperature of the high pressure water to the product mixture cooler (6) is at least 60° C. such as at least 80° C., preferably the inlet temperature of the high pressure water to the product mixture cooler (6) is at least 100° C. such as at least 110° C. In many embodiments, the inlet temperature of the high pressure water to the product mixture cooler (6) is in the range 100° C. to 150° C. such as in the range 110° C. to 140° C.

Often the product mixture is cooled to a temperature in the range 80° C. to 250° C. in the cooler (6) such as in the range 100° C. to 200° C., preferably the is cooled to a temperature in the range 120° C. to 180° C. such as to a temperature in the range 130° C. to 170° C. by heat exchange with the product mixture in the heat exchangers.

Figure 3:
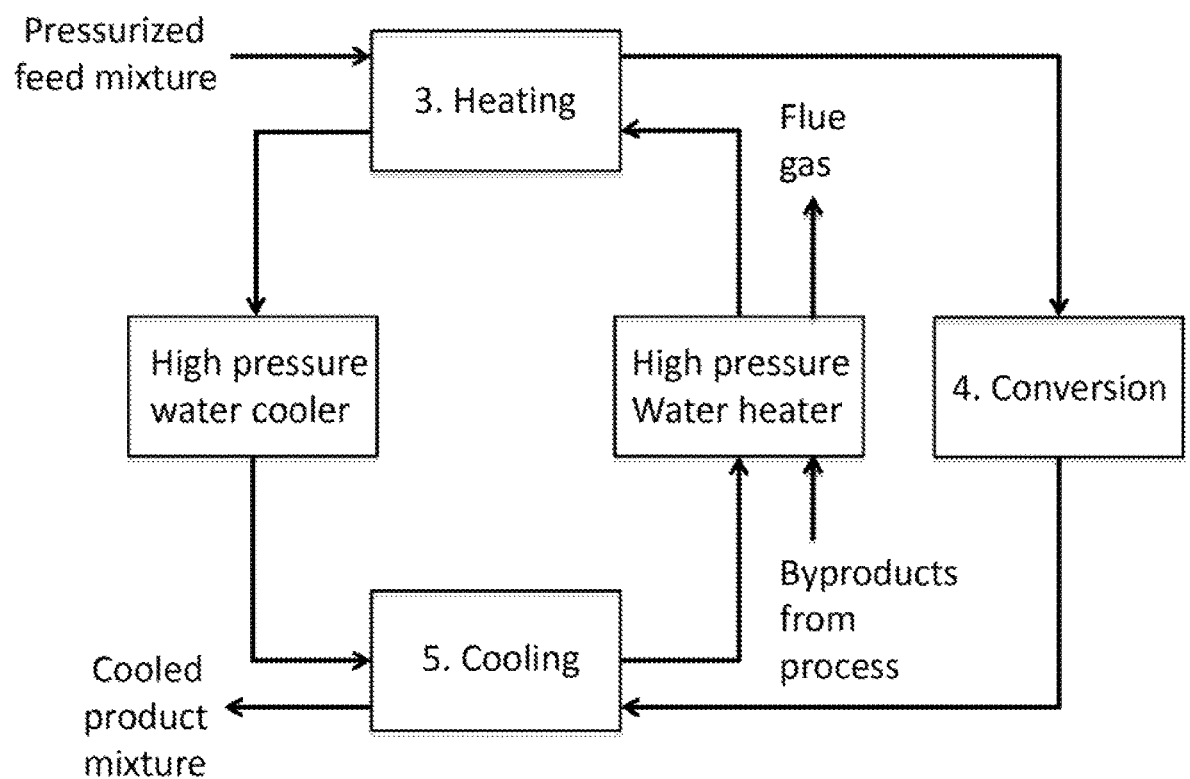
FIG. 3 shows a schematic overview of further embodiment of a heating and cooling system according to the invention where the high pressure heater is fuelled with gas from the process.

FIG. 3 shows a schematic overview of further embodiment of a heating and cooling system where the high pressure water heater is at least partly heated by combustion of by-products from the process. The by-products from may comprise process gas from the separation part of the process and/or from the upgrading part of the process, and/or fractions of the liquid hydrocarbons produced and/or water soluble organics a combustible solid product such as char produced by the process.

Hereby the energy recovery is increased and a very energy efficient process is provided. An advantageous embodiment of the present invention is where all the heat required in the high pressure water heater is supplied by the process. Hereby the process becomes self-sustained with energy for heating the feed mixture, and a very energy efficient process is provided.

Figure 4:
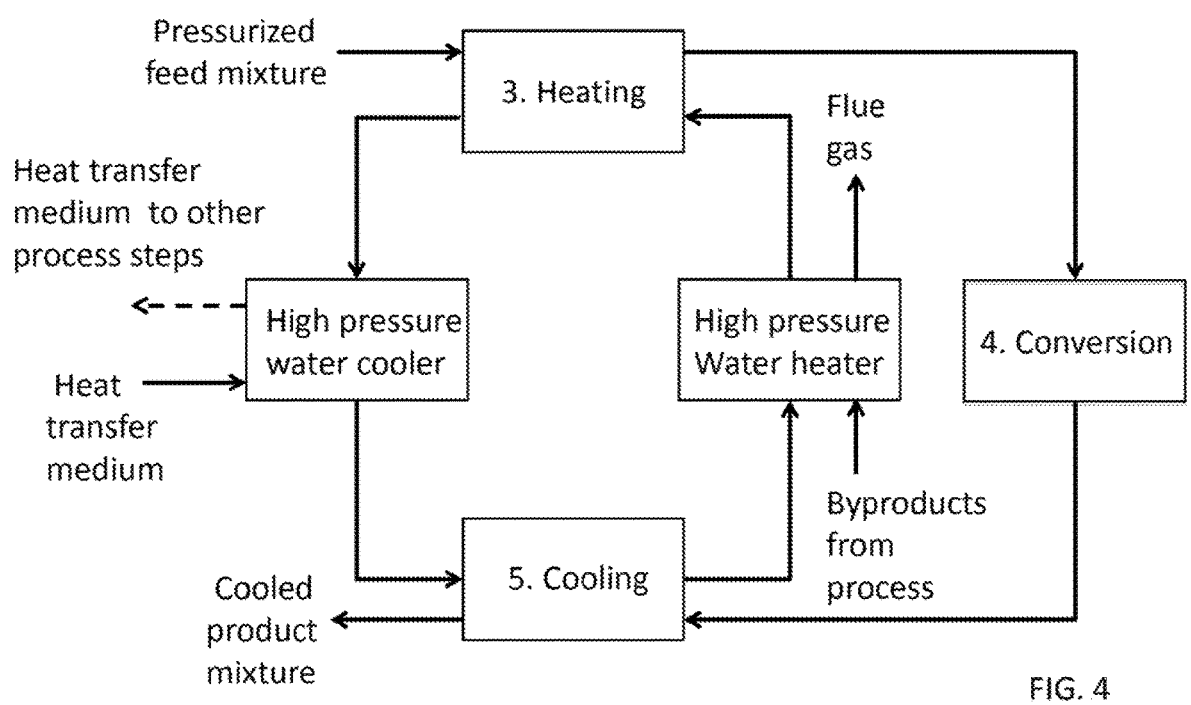
FIG. 4 shows a schematic overview of another embodiment of a heating and cooling system, where heat is transferred to a heat transfer medium in the high pressure water cooler and distributed to other parts of the process.

FIG. 4 shows a schematic overview of another embodiment of a heating and cooling system, where heat is transferred to a heat transfer medium in the high pressure water cooler and distributed to other parts of the process. The heat transfer medium may comprise a hot oil, water and/or steam and the heat transfer medium may be used to distribute energy extracted from the high pressure water to other parts of the process such as to the feed preparation step and/or the recovery step and/or the upgrading step.

Figure 5:
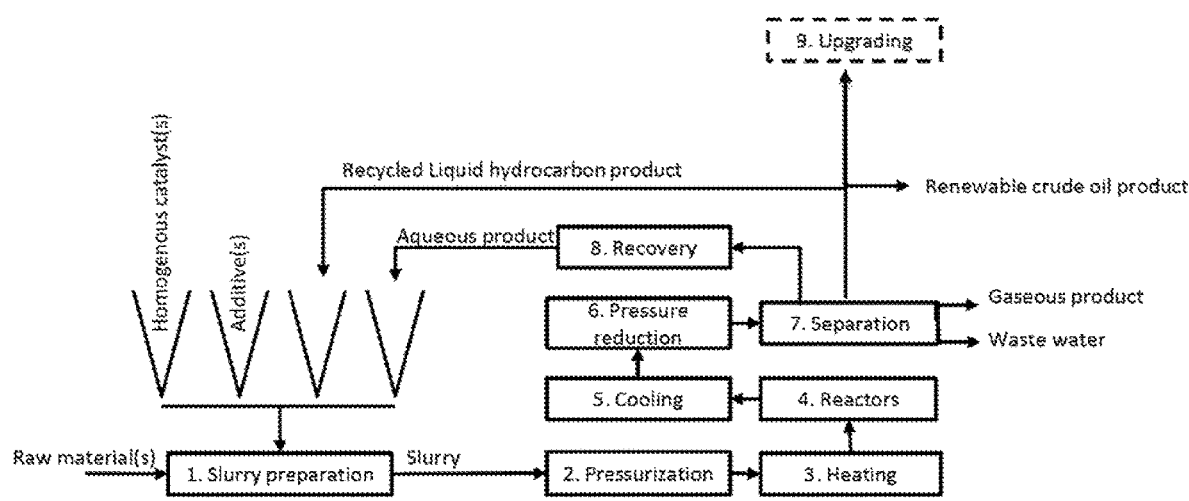
FIG. 5 shows a schematic overview of an advantageous embodiment of a high pressure high temperature process system.

FIG. 5 shows an advantageous embodiment of a high pressure process for hydrothermal transformation of carbonaceous such as biomass in to renewable transportation fuels, lubricants and/or fine chemicals comprising pressurization and a pressure let down system.

Figure 6:
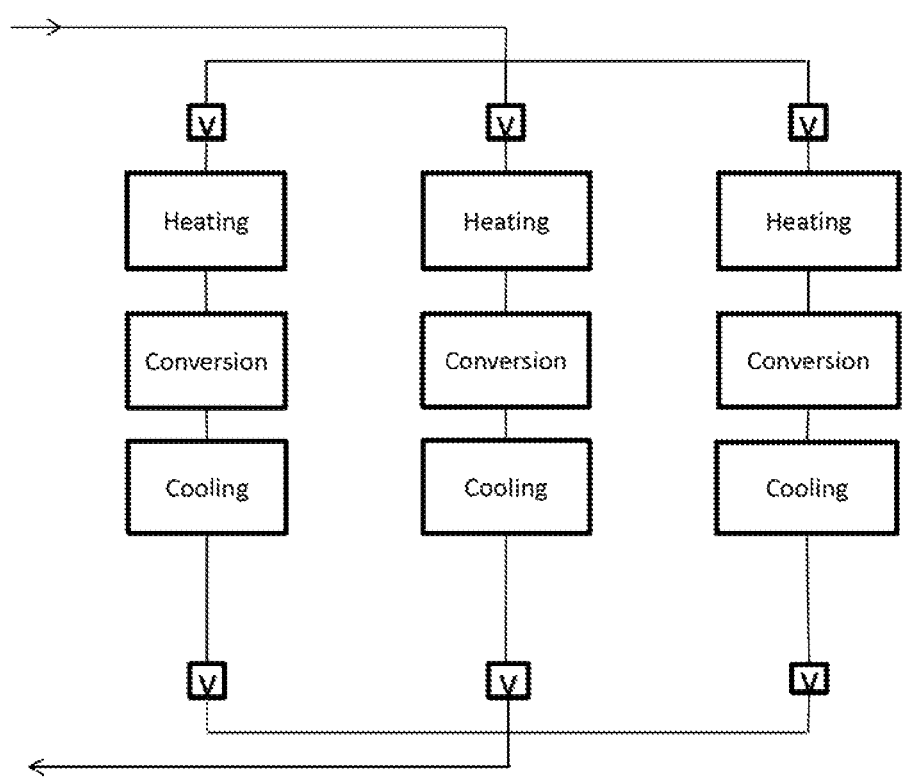
FIG. 6 shows schematically three parallel units of a system as described in connection with the previous FIGS. 1-5.

In FIG. 6 three parallel conversion units are depicted, each conversion unit comprising a string with a heater, a conversion volume and a cooler. Further valve units V are provided upstream and downstream each string. The valves V will provide an option for closing of a single string and performing maintenance and repair work on such closed string, without having to shut down the entire processing system and hence provide for an increased availability of the entire system.

Figure 7:
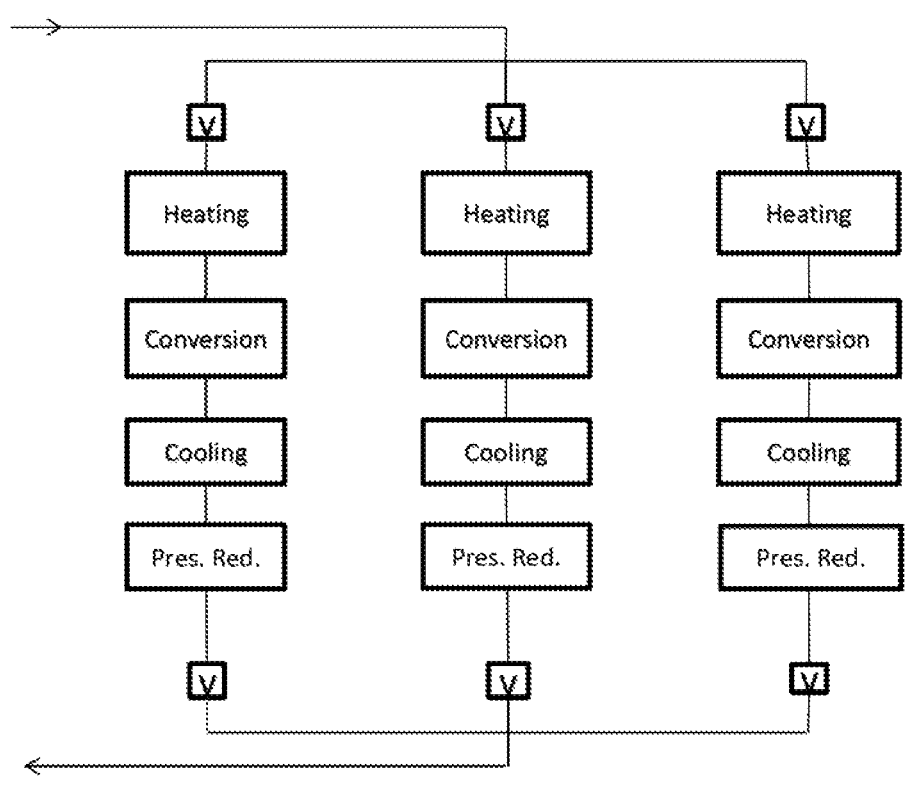
FIG. 7 shows schematically a different embodiment of three parallel units of a system as described in connection with the previous FIGS. 1-5.

In FIG. 7 a further embodiment of the invention is shown schematically, where the conversion units beyond the elements featured in FIG. 6, each further comprises a pressure reduction unit.

Figures 8A, 8B:
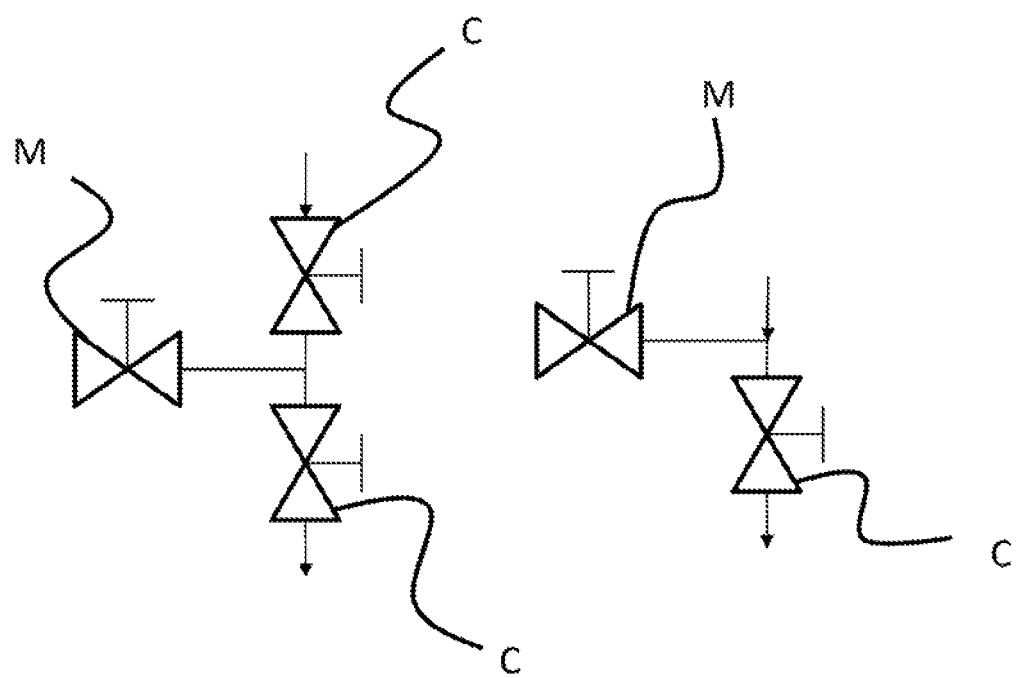
FIGS. 8A and 8B schematically show two embodiments of closure valve units.

In FIG. 8A a valve unit V is shown comprising two closure valves C arranged in series relative to the conversion unit. Between the two closure valves C a maintenance valve M is provided in order to ensure a possibility of reducing the pressure in the string between the closure valves and between the valve units V to ambient pressure. Hereby it is possible to provide service and maintenance operation to a single string while other strings of the system are still operational. This embodiment will provide for a high safety level operation and maintenance. A further embodiment is shown in FIG. 8B where only one closure valve is used. Although the safety level is somewhat reduced the solution will in principle provide for the same functionality as the embodiment shown in FIG. 8A.

Figure 9:
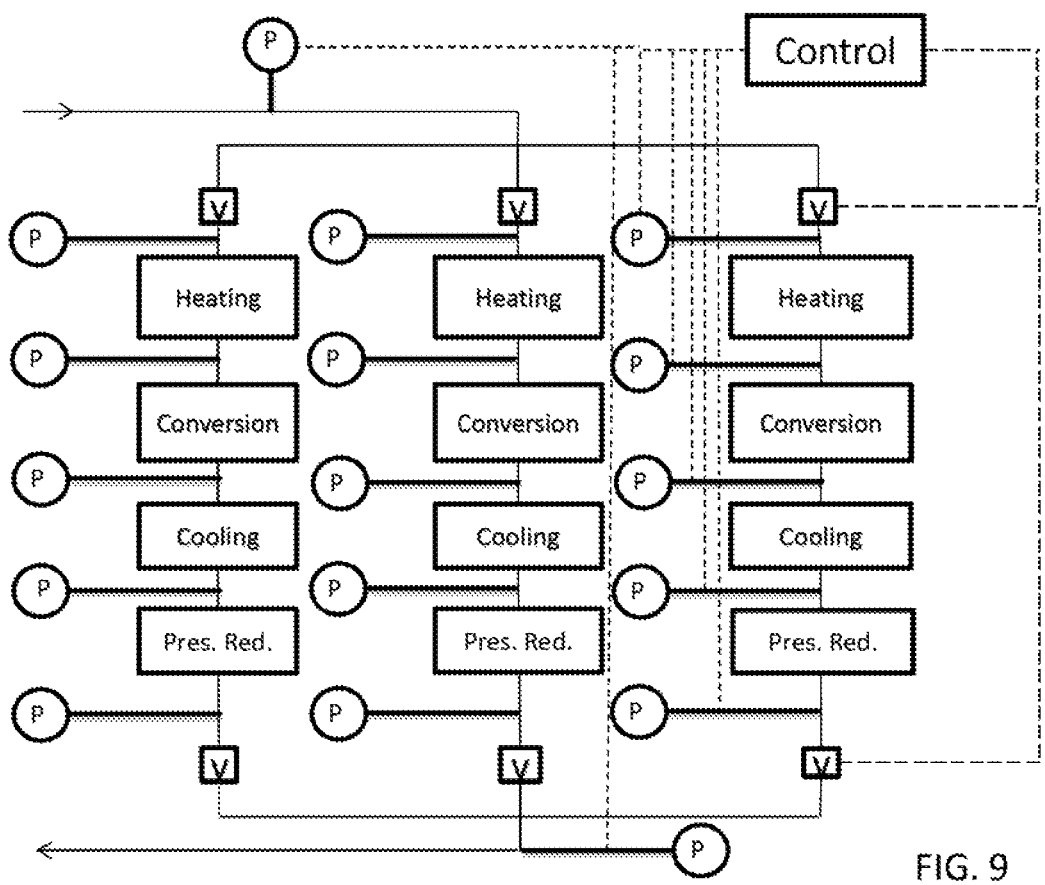
FIG. 9 shows schematically a different embodiment of three parallel units of a system as described in connection with the previous FIGS. 1-5.

FIG. 9 further shows an overview of an advantageous system, where the pressure is measured before the valve units, and for each of the conversion units are measured before the heater, before the reactors(-s), and before and after the cooler. By measuring the pressure at these positions it is obtained that an eventual pressure in one of the units can be continuously monitored during operation. The system allows for monitoring and identifying a pressure build up in a conversion unit. Advantageously a control unit is connected to the pressure measurements (in the drawing only shown connected to the pressure measurements in one string by dotted lines) that in the case of a pressure drop build up will seal the conversion unit by closing both valve units of the specific line. As a first cleaning attempt a cleaning pulse may be established by opening the one of the maintenance valves for a few seconds, where by an eventual pressure build up may be removed. In cases where the pressure build up can not be removed, the specific conversion unit is taken off line by closing the valve units. Advantageous this is performed by sealing the conversion unit and keeping it under pressure while cooling to prevent evaporation of the low boiling components from the product, and thereby leaving a solid residue in the equipment. As the hot part of the conversion unit will still be hot initially it means that a pressure increase due to heating a confined space is possible. The situation is according to a preferred embodiment handled by pressure relief through of the maintenance valves.

1. Preparation of Feed Mixture

The first step of the process is to prepare a feed mixture in the form of a pumpable slurry of the carbonaceous material. This generally includes means for size reduction and slurrying such as dispersing the organic matter with other ingredients such as water, catalysts and other additives such as organics in the feed mixture, A carbonaceous material may be in a solid form or may have a solid appearance, but may also be in the form of a sludge or a liquid. Further the carbonaceus material(-s) may be contained in one or more input streams.

Non limiting examples of carbonaceous feedstock include biomass such as woody biomass and residues such as wood chips, saw dust, forestry thinnings, road cuttings, bark, branches, garden and park wastes & weeds, energy crops like coppice, willow, miscanthus, and giant reed; agricultural and byproducts such as grasses, straw, stems, stover, husk, cobs and shells from e.g. wheat, rye, corn rice, sunflowers; empty fruit bunches from palm oil production, palm oil manufacturers effluent (POME), residues from sugar production such as bagasse, vinasses, molasses, greenhouse wastes; energy crops like miscanthus, switch grass, sorghum, jatropha; aquatic biomass such as macroalgae, microalgae, cyano bacteria; animal beddings and manures such as the fibre fraction from live stock production; municipal and industrial waste streams such as black liquor, paper sludges, off spec fibres from paper production; residues and byproducts from food production such as juice or wine production; vegetable oil production, sorted municipal solid waste, source sorted house wastes, restaurant wastes, slaughter house waste, sewage sludge and combinations thereof.

Many carbonaceous materials are related to lignocellulose materials such as woody biomass and agricultural residues. Such carbonaceous materials generally comprise lignin, cellulose and hemicellulose.

An embodiment of the present invention includes a carbonaceous material having a lignin content in the range 1.0 to 60% by weight such as lignin content in the range 10 to 55% by weight. Preferably, the lignin content of the carbonaceous material is in the range 15 to 40% by weight such as 20 to 40% by weight.

The cellulose content of the carbonaceous material is preferably in the range 10 to 60% by weight such as cellulose content in the range 15 to 45% by weight. Preferably, the cellulose content of the carbonaceous material is in the range 20 to 40% by weight such as 30 to 40% by weight.

The hemicellulose content of the carbonaceous material is preferably in the range 10 to 60% by weight such as cellulose content in the range 15 to 45% by weight. Preferably, the cellulose content of the carbonaceous material is in the range 20 to 40% by weight such as 30 to 40% by weight.

Depending on the specific organic matter being transformed and how it is received, the size reduction may be conducted in one or more steps e.g. the carbonaceous material may be treated as is and subsequently mixed with other ingredients in the same step or it may pre-grinded to a size suitable for further processing and size reduction in the mixing step. Often the carbonaceous material is size reduced to a particle size less than 15 mm such as a particle size of less than 10 mm the pre-grinding step; preferably to a particle size of less than 5 mm such as less than 3 mm.

The pre-grinding may be performed using a shredder, cutting mill, hammer mill, pan grinder, impeller mill or a combination thereof.

Advantageously the pre-grinding step may further comprise means for removal of impurities such as metals, stones, dirt like sand, and/or to separate off spec fibres from the carbonaceous material with particle size with said maximum size. Such means may comprise magnetic separation, washing, density separation such as flotation, vibration tables, acoustic separators, sieving and combinations thereof. Said means may be present prior to the pre-grinding step and/or after the pre-grinding step.

The carbonaceous material is subsequently mixed with other ingredients of the feed mixture. Other ingredients may include:

1. Recycled oil (hydrocarbons) produced by the process or a fraction of the oil (hydrocarbon produced by the process; preferably in a weight ratio to dry ash free organic matter in the range 0.5 to 1.5 such as a ratio 0.8 to 1.2; The recycled oil may comprise phenols, alkylated phenols, polyphenols, monomeric and oligomeric phenols, creosol, thymol, alkoxy phenols, p-coumaryl alcohol, coniferyl alcohol, sinapyl alcohol, flavenols, catechols.

2. Recycled concentrate of the water phase from the process comprising recovered homogeneous catalyst and water-soluble organics such as one or more components selected from a. Ketones such as acetone, propanones, butanones, penthanones, penthenones, cyclopentanones such as 2,5 dimethyl cyclopentanone, cyclopentenones, hexanones and cyclohexanones such as 3-methyl hexanone, quionones etc.

b. Alcohols and poly alcohols such as methanol, ethanol, propane's (incl isopropanol), buthanols, penthanols, hexanols, heptanols, octanols such as 2-butyl-1-octanol, hydroquinones etc c. Phenols, alkylated phenols, poly-phenols, monomeric and oligomeric phenols, creosol, thymol, alkoxy phenols, p-coumaryl alcohol, coniferyl alcohol, sinapyl alcohol, flavenols, catechols d. Carboxylic acids such as formic acid, acetic acid and phenolic acids like ferric acid, benzoic acids, coumarin acid, cinnamic acid, abietic acid, oleic acid, linoleic acid, palmetic acid, steric acid e. Furans such as THF etc f. Alkanes, alkenes, toluene, cumene etc. and combinations thereof.

In general the water soluble organics constitute a complex mixture of the above and the feed mixture may comprise such water soluble organics in a concentration from about 1% by weight to about 10% by weight such as in the range from about 2% by weight to about 5% by weight.

3. Make up homogeneous catalyst in form a potassium carbonate and/or potassium hydroxide and/or potassium acetate; preferably added in the form of an aqueous solution and added in an amount so that the total concentration of potassium in the resulting feed mixture is at least 0.5% by weight such as a concentration in the feed mixture of at least 1.0% by weight; preferably the concentration of potassium is at least 1.5% by weight such as at least 2.0% by weight;

4. Make up base for pH adjustment. Preferably, sodium hydroxide is added to the feed mixture in an amount so as the pH measured in the recycled water phase is above 7 and preferably in the range 8.0 to 12.0 such as in the range 8.0 to 10.0.

The ingredients 1.-4. are preferably all on a liquid form and may advantageously be premixed and optionally preheated, before being mixed with the organic matter to produce said feed mixture. Premixing and/or preheating may reduce loading time and heating time required in the mixer.

The mixing of the carbonaceous material and other ingredients are mixed so as to form a homogeneous slurry or paste. Said mixer may be a stirred vessel equipped with means for efficiently mixing, dispersing and homogenizing viscous materials such as a planetary mixer, Kneader or Banbury mixer. The mixer is preferably further equipped with means for preheating said feed mixture to a temperature in the range 80° C. to 220° C., preferably in the range 130° C. to 200° C. and more preferably in the range 150° C. to 180° C., at sufficient pressure to avoid boiling such as a pressure in the range 1-30 bars, preferably in the range 4-20 bars such as in the range 5-10 bars. Heating the feed mixture to temperatures in the above ranges results in a softening and/or at least partly dissolution of the carbonaceous thereby making the feed mixture easier to size reduce and homogenize. Preferred means for heating said feed mixture during the preparation include a heating jacket. In a preferred embodiment the heat for preheating said feed mixture is obtained from the cooling of the converted carbonaceous material comprising liquid hydrocarbon product e.g. by use of a heat transfer medium for extraction of heat from the high pressure water cooler to a heat transfer medium and for distribution of heat as described in further details above in relation to FIG. 3-FIG. 5. Hereby the energy efficiency of the process may be further enhanced. The mixer may further be equipped with a re-circulation loop, where material is withdrawn from said mixer and at least partly re-circulated in an internal or external loop and re-introduced into said mixer so as to control the feed mixture characteristics e.g. rheological properties such as viscosity and/or particle size to a predefined level. The external loop may further comprise one or more size reduction and/or homogenization device(-s) such as a macerator and/or a colloidal mill and/or a cone mill or a combination thereof in a series and/or parallel arrangement.

Preferably, the carbonaceous material is fed to the mixer gradually rather than at once to control the viscosity of the feed mixture and that feed mixture remains pumpable, while being size reduced and homogenized. The control of the viscosity may be performed by measuring the power consumption of the mixer and/or colloidal mill and adding organic matter to the feed mixture according to a predefined power consumption. It is further advantageous not to empty the mixer completely between batches as the prepared feed mixture acts as a texturing agent for the next batch and thereby assists in homogenizing the next batch by making it more pumpable, and thereby the carbonaceous material may be added faster.

Other preferred means for thoroughly mixing and homogenizing the ingredients in the feed mixture include inline mixers. Such inline mixers may further introduce a cutting and/or a scissoring and/or a self-cleaning action. An preferred embodiment on such inline device include one or more extruders.

The feed mixture from the feed mixture mixing step may be fed to a holding tank before entering the pressurization step of the process. Said mixing tank may be equipped with means for agitating said feed mixture in the holding tank and/or circulation means for circulating said feed mixture around said holding tank whereby the feed mixture is maintained in a shear thinned and easier to pump state. Optionally the feed mixture may be expanded before entering the holding tank, whereby the feed mixture may be further size reduced and homogenized.

Typically, the dry content of carbonaceous material in the feed mixture is in the range 10 to 40% by weight, preferably in the range 15 to 35% and more preferably in the range 20 to 35% by weight.

The process typically requires water to be present in said feed mixture. Typically, the water content in said feed mixture is at least 30% by weight and in the range 30 to 80% by weight and preferably in the range 40 to 60%.

2. Pressurization

The second step of an advantageous embodiment of a high pressure process is pressurization to the desired pressure for said conversion process. Said pressurization to the desired reaction pressure is essentially performed before heating from entry temperature from the feed mixture preparation step to the reaction temperature in the high pressure water heating cooling system is initiated Typically the feed mixture is pressurized to an operating pressure during said heating and conversion of at least 150 bars such as 180 bars, preferably said operating pressure is at least 221 bars such as at least 250 bars and more preferably said operating pressure during conversion is at least 300 bars. Even more preferably, the operating pressure is in the range of 300-400 bars such as in the range 300-350 bars.

Many embodiments relate to processing of feed mixtures with a high content of carbonaceous material as described above. Such feed mixtures typically have densities in the range 1050 to 1200 kg/m3, and typically behaves as a homogeneous pseudoplastic paste rather than a suspension of discrete particles (liquid). The viscosity of such pastes may vary widely with shear rate due to the pseudoplastic (shear thinning) behavior and may be in the $10^3$ to $10^7$ cP depending of the specific shear rate and carbonaceous material being treated.

An aspect of the present invention relates to a pressurization system for pressurizing such highly viscous pseudoplastic feed mixtures. The pressurization system comprises two or more pressure amplifiers each comprising cylinders with a piston equipped with driving means for applying and/or receiving a force to the piston such as shown and described in connection with FIG. 2-9. Advantageous driving means for the pistons in the cylinders include hydraulically driven means.

In an advantageous embodiment pressure energy is recovered in the pressure reduction step described below under step 6. Pressure reduction, and transferred to an energy absorption reservoir, where the energy absorbed by the pressure reducing device is transferred to the reservoir for successive utilization in e.g. the pressurization step. Thereby a very energy efficient high pressure process is obtained.

3. Heating

The pressurized feed mixture is subsequently heated to a reaction temperature of at least 340° C. and up to about 450° C. such as in the range 350° C. to 430° C., preferably in the range 370° C. to 430° C. such as in the range 380° C. to 420° C., more preferred in the range 390° C. to 420° C. such as in the range 400° C. to 415° C.

The heating of the feed mixture is performed by indirect heat exchange with high pressure water. By use of such heat transfer medium it is obtained that both the feed mixture and the product mixture may flow inside tubes thereby allowing for easier cleaning.

By said heat recovery it is obtained that the process becomes very energy efficient as most of the heat required is recovered. In many embodiments of the present invention at least 40% of the energy required to heat the feed mixture to the desired reaction temperature is being recovered such as at least 50% of the energy required to heat the feed mixture to the desired reaction temperature is being recovered. Preferably, at least 60% required to heat the feed mixture to the desired reaction temperature is recovered such as at least 70% of the energy required being recovered.

4. Reaction

Subsequent to heating to reaction temperature said pressurized and heated feed mixture is maintained at the desired pressure and temperature in a reaction zone c. for a predefined time. The feed characteristics and/or the combination of pressure and temperature generally allow for shorter reaction times and/or a more reacted liquid hydrocarbon product than in the prior art without sacrificing the yield and/or quality of the desired product. The predefined time in said reaction zone may be in the range 1 to 60 minutes such as 2 to 45 minutes, preferably said predefined time in said reaction zone is in the range 3 to 30 minutes such as in the range 3 to 25 minutes, more preferred in the range 4 to 20 minutes such as 5 to 15 minutes.

5. Cooling

The outlet stream from the reactor comprising liquid hydrocarbon product, water with water soluble organics and dissolved salts, gas comprising carbon dioxide, hydrogen, and methane and eventually suspended particles from the converted carbonaceous material, enters the cooler (6), where it is cooled by contact with high pressure water from the high pressure water cooler as shown and described in FIG. 2-4.

Typically, the inlet temperature of the high pressure water to the product mixture cooler (6) is at least 60° C. such as at least 80° C., preferably the inlet temperature of the high pressure water to the product mixture cooler (6) is at least 100° C. such as at least 110° C. In many embodiments, the inlet temperature of the high pressure water to the product mixture cooler (6) is in the range 100° C. to 150° C. such as in the range 110° C. to 140° C.

Often the product mixture is cooled to a temperature in the range 80° C. to 250° C. in the cooler (6) such as in the range 100° C. to 200° C.; preferably the is cooled to a temperature in the range 120° C. to 180° C. such as to a temperature in the range 130° C. to 170° C. by heat exchange with the product mixture in the heat exchangers.

A preferred embodiment of the present invention is where said heat exchange is performed by indirect heat transfer with high pressure water. By use of such indirect heat transfer via a heat transfer medium it is obtained that both the feed mixture and the product mixture can flow inside tubes thereby allowing for easier cleaning. The heat transfer medium may optionally be further heated and/or be further cooled so as to allow for added controllability and flexibility of the heating and cooling. Said heat transfer medium may also be used for transfer of heat to/from other unit operations of the process such as e.g. the pre-treatment 1 and/or the upgrading part of a process.

6. Pressure Reduction

The cooled product enters a pressure reducing device, where the pressure is reduced from The cooled product mixture thereafter enters a pressure reducing device, where the pressure reduction unit comprises at least one inlet and an outlet, the pressure reduction unit being adapted to receive a pressurized fluid at process pressure level at the inlet, being adapted to isolate the received pressurized fluid from the upstream process and from the outlet and being adapted to reduce the pressure of the fluid to a lower predetermined level and further being adapted to output the fluid through the outlet while still isolated towards the upstream process.

In general, pressure reduction unit comprises an actuated valve at the inlet and an actuated valve at the outlet and between the inlet valve and the outlet valve a pressurization device. Further a pressure reduction unit comprises means for measuring the pressure upstream the inlet valve, between the inlet valve and the outlet valve and downstream the outlet valve.

The pressure reduction unit may further comprise a pump unit having a cylinder and a piston as well as means for driving the piston inside the cylinder. Advantageously the pressure reduction unit further comprises a position indicator indicating the cycle position of the pressure reduction device and being adapted to provide a control signal for opening or closing at least one valve in the pressure reduction system.

An advantageous embodiment of a pressure reduction device is where the pressure reduction pump is connected to a further pump that drives a pressurization of the energy absorption reservoir. For example, the pressure reduction device further comprising an energy reservoir, where the pressurization pump is operatively connected to the reservoir and where the energy absorbed by the pump is converted and transferred to the pressurization pump.

In a preferred embodiment, the energy reservoir drives a pressurization pump adapted to pressurize the feed mixture in the pressurization step (step 2 above) of the high pressure process. In one embodiment of the present invention, this is performed by a low pressure turbine connected to a generator generating electrical energy, and the electricity generated reduces the energy required to drive the pressurization pump in the pressurization step.

The pressure reducing device are typically designed for low stroke speeds (large stroke volume) thereby allowing for the use of actuated valves for filling and emptying of the cylinders rather than check valves. Preferred actuated valves include gate valves and ball valves or a combination thereof.

The stroke speed of the pistons may be from about 1 stroke per minute up to about 150 strokes per minute such as from about 5 strokes per minute up to about 100 strokes per minute. Preferably the stroke speed of the pistons are from about 10 to about 80 strokes per minute such as a stroke speed of the piston in the range 20 strokes per minute to about 60 strokes per minute. Besides allowing for the use of actuated valves, the low stroke speed of the piston reduces the wear on pistons, seals and valve seats.

The inlet temperature to the pressure reduction device is generally in the range from about 10° C. to about 250° C. such as from about 20° C. to about 220° C.; preferably the inlet temperature to the pressure amplifying cylinders is in the range from about 50° C. to about 210° C. such as from about 80° C. to about 200° C.; even more preferably the inlet temperature to the pressure amplifying cylinders is in the range from about 100° C. to about 180° C. such as from about 120° C. to about 170° C.

For applications where the temperature exceeds about 120° C. such as about 140° C., the cylinders may further be equipped with means for cooling the seals of piston in order to withstand the operating conditions described above.

7. Separation

The depressurized mixture from said pressure reduction containing liquid hydrocarbon product is subsequently lead to separation. The separation may comprise means for separating gas from said mixture. Said separation means may comprise a flash separator or degasser, wherein gas is withdrawn from the top. Said gas may be used to produce heat for heating in the process to the process as shown in the figure and further described above. The gas may optionally be cooled to condense compounds such as e.g. water prior to said use to produce heat for heating in the process.

A particularly preferred embodiment includes a system where the converted feed mixture/product mixture is first cooled to a temperature of 60 to 250° C., expanded to a pressure in the range from about 10 to about 150 bars such as in the range from about 15 to about 100 bars and led to a phase separator/degasser for separation of the product mixture into at least a gas phase and residual phase.

In an advantageous embodiment the separated gas phase is first cooled to a temperature in the range 80° C. to about 200° C., expanded to a pressure in the range 60 to 110 bars such as in the range 70 to 100 bars and led to a phase separator/degasser for separation of the converted feed mixture/product mixture into at least a gas phase and a residual phase.

As further exemplified below, the gas phase often comprises carbon dioxide, hydrogen, carbon monoxide, methane, ethane, ethane, propane, iso-propane, butane, iso-butane, water, methanol, ethanol, acetone.

An advantageous embodiment of the present invention includes extracting/separating hydrogen from the separated gas phase and introducing it into said process for upgrading of the hydrocarbons (optional step 8)

An embodiment of the present invention comprises extracting/separating hydrogen from the separated gas phase by a membrane gas separation technique. Another embodiment of the present invention comprises extracting/separating hydrogen using a pressure swing adsorption technique. A further embodiment of the present invention comprises extracting/separating hydrogen from said separated gas phase by the steps of:

separating the converted feed mixture/product mixture into a gas phase and a residual phase cooling the separated gas to a temperature in the range from about 31° C. to 50° C. and separating the cooled gas phase into a condensed phase substantially free of hydrogen and a residual gas phase enriched in hydrogen and carbon dioxide in a phase separator, further cooling the separated gas phase to a temperature in the range from about 10° C. up to about 31° C. and separating the cooled residual gas phase into a liquid phase comprising $CO_2$ and a residual gas phase enriched in hydrogen in a separator.

introducing the hydrogen enriched gas in the upgrading process after the pressurization step.

The separating means may further provide at least a coarse separation of the degassed mixture into a liquid hydrocarbon rich stream and residual water rich stream e.g. by gravimetric separation in a 3-phase separator.

The water rich stream comprising water soluble organics, suspended particles and dissolved salts may be at least partly withdrawn from said gravimetric separator, and fed to a recovery unit, optionally after further separation by gravimetric means filtering and/or centrifugation to remove suspended particles.

The degassed mixture or optionally the liquid hydrocarbon rich stream, is withdrawn from said gas separating means, and may be further separated e.g. the liquid hydrocarbon rich stream may be required to be efficiently dehydrated and/or desalted/deashed before being introduced into the upgrading part of the process.

In many aspects of the present invention said further separation comprises one or more gravimetric separation step(-s) optionally equipped with means for coalescing oil or water droplets such as one or more electrostatic coalescing steps. In other aspects of the present invention said further separation may include separation in one or more centrifugation step(-s) such as separation in one or more 3-phase centrifuges such as one or more high speed disc bowl centrifuges and/or one or more decanter centrifuges.

Often the operating temperature of the further separation is selected so as to obtain a dynamic viscosity of the liquid hydrocarbon product in the range from about 1 to about 30 centipoise during said further separation such as in the range from about 1 to about 25 centipoise during said further separation, preferably the temperature of the separation is selected so as to obtain a dynamic viscosity in the range from about 1 to about 20 centipoise such as in the range 5 to 15 centipoise.

The operating temperature of said further separation may be in the range 80° C. to 250° C. such as in the range 120° C. to 200° C., preferably at least the first of said further separation is operating at a temperature in the range 130° C. to 180° C. such as a temperature in the range 150° C. to 170° C.

The operating pressure of said further separation may be in the range 10 to 120 bar, such as in the range 15-80 bars, preferably said further separation is operating at a pressure in the range 25 to 50 bar, such as in the range 30-50 bars.

Many aspects of the present invention relates to the use of one or more phase separators, where the residence time in each of the phase separators is in the range 1-30 minutes such as in the range 1 to 20 minutes, preferably the residence time in each of the separators are in the range 2 to 15 minutes.

In a further aspect of the present invention a viscosity reducing agent may be added to the converted feed mixture before and/or during the further separation. The viscosity reducing agent may often be an organic solvent having a boiling point below 200° C. such as below 150° C., preferably below 140° C. such as below 130° C.

The weight ratio of the viscosity reducing agent added to the amount of renewable oil may be in the range 0.01 to 2 such as in the range 0.05 to 1, preferably the weight ratio of the viscosity reducing agent added to the amount of low sulphur oxygen containing renewable oil is in the range 0.1 to 0.5 such as in the range 0.1 to 0.4. More preferably the weight ratio of the viscosity reducing agent added to the amount of low sulphur oxygen containing renewable oil is in the range 0.2 to 0.4 such as in the range 0.2 to 0.35.

An embodiment is where the viscosity reducing agent comprises at least one ketone such as Methyl Ethyl Ketone (MEK) and/or 2-heptanone and/or 2,5 dimethyl-cyclo-pentanone or a combination thereof.

Advantageously the viscosity reducing agent comprises a fraction of the low oil and is recovered down stream of said further separation step and prior to providing the low sulphur oxygen containing renewable oil to said optional upgrading step.

According to an embodiment, the viscosity reducing agent is recovered in an evaporation step operating at a temperature in the range 100° C. to 200° C. such as in the range 100° C. to 160° C., preferably the viscosity reducing agent is recovered in an evaporation step operating at a temperature in the range 100° C. to 150° C. such as in the range 100° C. to 130° C.

An embodiment of the present invention is where the viscosity reducing agent is substantially recovered in one or more flash distillation step(-s) producing a low sulphur containing oil phase and a distillate phase, and where the flash temperature is in the range 100° C. to 200° C. such as in the range 100° C. to 160° C., preferably the viscosity reducing agent is recovered in the flash distillation step producing a low sulphur containing oil phase and a distillate phase, where the flash temperature is in the range 100° C. to 150° C. such as in the range 100° C. to 130° C.

A washing agent comprising water may be added to the liquid hydrocarbon product before or during said further phase separation step in order to further control the salt/ash content of the oil before being introduced to the upgrading step. The washing agent comprising water may be introduced in several steps.

The weight ratio of the washing agent comprising water to oil may advantageously be in the range 0.05 to 5.0 such as a weight ratio of the washing agent comprising water to the oil is in the range 0.05 to 3.0, preferably the of the washing agent comprising water to the oil is in the range 0.1 to 2.0 such as a weight ratio in the range 0.1-1.0.

The washing agent comprising water may further comprise an acidification agent such as acetic acid or citric acid. The acidification agent may be added so as to obtain a pH of the water phase after separation of the washing agent comprising water in the range 2 to 7 such as a pH in the range 2.5 to 6.5, preferably the acidification agent is added so as to obtain a pH of the water phase after separation of the washing agent comprising water in the range 2.75 to 6 such as a pH in the range 3 to 5.5.

The further separation may further comprise one or more filtration step(-s) of the liquid hydrocarbon product. The filtration step may comprise the first step of the further separation and/or the filtration step may be a final step before optionally introducing the oil to an upgrading process.

8. Recovery

The water phases from the gas separating means, and further separation means are fed to a recovery device, where liquid organic compounds in the form of water-soluble organics and/or homogeneous catalysts are recovered in a concentrated form, and recycled to into the feed mixture preparation device 1. As mentioned above under 1. Preparation the water soluble organics present in said water phase comprise a complex mixture of hundreds of different compounds including one or more compounds of ketones, alcohols and poly alcohols, phenols and alkylated phenols, carboxylic acids, furans, alkanes, alkenes, toluene, cumene etc.

Preferably said recovery device, comprises one or more evaporation step(-s), wherein water is evaporated from said combined water phases, and thereby providing a distillate and a concentrate. The degree of concentrating is selected so as to provide a distillate amount that corresponds to the amount of water added with the carbonaceous material, homogeneous catalyst and make up base in the pre-treatment. Typically, the ratio of concentrate to the combined water phases entering the recovery unit is typically in the range from about 0.1 to about 0.9 such as in the range 0.2 to 0.8. Often the ratio of concentrate to the combined water phases entering the recovery unit is in the range from about 0.25 to about 0.7 such as in the range 0.3 to 0.6. In other embodiments of the present invention the ratio of concentrate to the combined water phases entering the recovery unit is typically in the range from about 0.25 to about 0.6 such as in the range 0.3 to 0.6.

The combined water phases may be preheated to a temperature of e.g. 70-130° C. such as a temperature in the range 80 to 115° C. before entering into said evaporator. The heat for said preheating is preferably provided by heat recovery from a process stream and/or from the outgoing distillate stream before entering into the evaporator. In the evaporator, water is evaporated from said mixture comprising water soluble organics and dissolved salts at a temperature from about 100° C. to about 115° C. In these cases the heat recovery from said process stream may be performed via a heat transfer medium such as a hot oil.

The pH of the combined water phase entering the recovery is preferably maintained at alkaline conditions such as in the range 7 to 14 such as a pH in the range 8 to 12, preferably the pH of the water phase to the recovery unit is maintained in the range 8 to 11. Operating at such inlet pH to the recovery unit has the advantage of reducing the amount of phenolics in the distillate.

An embodiment of said recovery step is where the recovery step comprises one or more flash step(-s).

A preferred embodiment of said recovery step is where the recovery step comprises evaporation in two or more steps operating at a decreasing pressure and temperature and each being heated with the evaporated vapor from the foregoing step to minimize the heat required for the evaporation.

The evaporator may advantageously further comprise condensing said evaporated vapor in two or more condensation steps, where the condensation temperatures in said condensation steps are decreasing so as to obtain a fractionation of the evaporated fraction i.e. a fraction comprising water and eventually higher boiling compounds, and a fraction where compounds having a boiling point temperature lower than water are concentrated.

Preferably said evaporated vapor passes a demister and/or a foam breaker prior to condensation of said evaporated fraction by cooling. Advantageously the evaporator may further be equipped with a coalescer an absorber, where the evaporated fraction is contacted with an absorbent. Said absorbent comprises in an embodiment a base such as sodium hydroxide.

The evaporator may in some embodiments include increasing the condensation temperature of said evaporated water by increasing the pressure by a blower, compressor (Mechanical Vapor Recompression) or a steam jet ejector (Thermal Vapor Recompression) or a combination thereof. Thereby the evaporated water vapor can be used as a heating medium for the evaporation in said evaporator, and said evaporator becomes very energy efficient as the latent heat of evaporation does not need to be supplied to said evaporation step.

It should be noted that said condensers may comprise heat exchangers where the media to be concentrated are evaporated on the other side, but in general said evaporation step comprises at least one additional condenser compared to the number of evaporation steps.

The fraction comprising evaporated water ("distillate") may further be cooled to a temperature suitable for discharge in a cooler. Hereby, it is obtained that said evaporator besides recovering said liquid organic compounds and/or homogenous catalysts also cleans and purifies the water phase in an efficient manner, and can produce a water phase that may be reused or discharged to a recipient. Optionally the "distillate" may be subjected to one or more polishing steps. Said polishing steps may include an absorber and/or adsorber and/or a coalescing step and/or a membrane system such as reverse osmosis and/or a biological treatment system such as a bioreactor.

The fraction being concentrated with compounds having a boiling point lower than water may be mixed with the concentrate from said evaporator, and recycled to the feed mixture preparation step 1.

In many applications a bleed or purge stream is withdrawn from said concentrated water phase prior to recycling to the feed mixture preparation step 1 to prevent buildup of compounds such as chloride. The bleed stream may according to an embodiment of the present invention comprise up to about 40% by weight of the concentrated water phase from the recovery unit such as up to about 25% by weight of the concentrated water phase from the recovery unit. Preferably the bleed stream comprises up to about 20% by weight of the concentrated water phase from the recovery unit such as up to about 15% by weight of the concentrated water phase from the recovery unit. More preferably the bleed stream comprises up to about 10% by weight of the concentrated water phase from the recovery unit such as up to about 5% by weight of the concentrated water phase from the recovery unit. The bleed stream may be disposed of. However, in many applications the bleed stream is further treated.

The concentrated water phase from the recovery unit typically has a positive heating value.

A preferred application comprises further treating the bleed stream by combustion and/or co-combustion in a boiler or incinerator. Optionally the bleed stream is further concentrated prior to said combustion and/or co-combustion.

An embodiment comprises further treating the bleed stream in an ion exchange step. The concentrated water phase from the recovery unit may be filtered to remove eventual solids prior to entering said ion exchange step according to the present invention.

The ion exchange step may comprise one or more ion exchange steps such as one or more ion exchange resin(-s) contained in one or more fixed beds. Said one or more ion exchange steps may be arranged with one or more fixed bed(-s) in parallel and/or one or more fixed bed(-s) in series.

An embodiment comprises further treating the bleed stream comprises at least two fixed bed(-s), each containing a chloride selective ion exchange resin capable of selectively adsorbing chloride from said concentrated water phase from said recovery unit and arranged valves in a parallel arrangement so that at least one ion exchange bed is online and at least one ion exchange bed is offline. Hereby continuous operation is ensured and chloride removal can be continued in the ion exchange bed(-s) being online while ion exchange bed(-s) being offline can be cleaned. Said cleaning may be performed by a back flow or back flushing of the ion exchange bed(-s) by demineralized water such as distillate water from the recovery unit. The present invention includes a valve arrangement and/or control system allowing for such cleaning or regeneration by back flow or back flush with demineralized water.

Typically, the chloride removal in said ion exchange step according to the present invention is at least 50% of the chlorides in the concentrated water phase entering said ion exchange step such as a chloride removal of at least 60%. In many embodiments according to the present invention, the chloride removal in said ion exchange step is at least 70% of the chlorides in the concentrated water phase entering said ion exchange step such as at least 80%. The chloride depleted stream from said chloride ion exchange step is preferably recycled to the feed mixture preparation step 1.

Further, in many embodiments the amount of homogeneous catalyst(-s) in the form of potassium and/or sodium such as being retained in said chloride depleted outlet stream from said chloride ion exchange step is at least 70% by weight of the amount entering said chloride ion exchange step such as at least 80% by weight. Preferably, the amount of homogeneous catalyst(-s) in the form of potassium and/or sodium such as being retained in said chloride depleted outlet stream from said chloride ion exchange step is at least 85% by weight of the amount entering said chloride ion exchange step such as at least 90% by weight. Hereby, less make up homogeneous catalyst is required to be added in the pretreatment step 1, and a more economical process is obtained for providing crude oil to the upgrading process according to the present invention, and thereby an overall more efficient and economical process is obtained.

The invention claimed is:

1. Processing system comprising
   at least one pressurization device;
   at least one separation device;
   at least one conversion section;
   at least one valve unit between the at least one pressurization device and the at least one conversion section;
   at least one valve unit between the at least one conversion section and the at least one separation unit;
   where the conversion section comprises at least two parallel conversion units;
   where each conversion unit comprises
      at least one heating device
      at least one reactor device, and
      at least one cooling device.

2. Processing system according to claim 1, where a closure valve unit is provided between the at least one pressurization device and each of the conversion units; and where a closure valve unit is provided between each of the conversion units and the at least one separation unit.

3. Processing system according to claim 2, where each of the closure valve units comprises a maintenance valve between two other valves of the closure valve unit.

4. Processing system according to claim 1, where a pressure reduction device is provided as part of a conversion unit.

5. Processing system according to claim 1, where the temperature of fluid is at least 375° C. and the pressure is at least 220 bar.

6. Processing system according to claim 1, where the temperature of fluid is at least 400° C.

7. Processing system according to claim 1, where cooling fluid is added to the hot side of the heat exchanger to cool the pressurized and processed feed stream.

8. Processing system according to claim 7, where the cooling fluid is further heated before entering the hot side of the heat exchanger.

9. Processing system according to claim 2, where a pressure reduction device is provided as part of a conversion unit.

10. Processing system according to claim 3, where a pressure reduction device is provided as part of a conversion unit.

11. Processing system according to claim 2, where the temperature of fluid is at least 375° C. and the pressure is at least 220 bar.

12. Processing system according to claim 3, where the temperature of fluid is at least 375° C. and the pressure is at least 220 bar.

13. Processing system according to claim 4, where the temperature of fluid is at least 375° C. and the pressure is at least 220 bar.

14. Processing system according to claim 2, where the temperature of fluid is at least 400° C.

15. Processing system according to claim 3, where the temperature of fluid is at least 400° C.

16. Processing system according to claim 4, where the temperature of fluid is at least 400° C.

17. Processing system according to claim 5, where the temperature of the fluid is at least 400° C.

18. Processing system according to claim 2, where cooling fluid is added to the hot side of the heat exchanger to cool the pressurized and processed feed stream.

19. Processing system according to claim 3, where cooling fluid is added to the hot side of the heat exchanger to cool the pressurized and processed feed stream.

20. Processing system according to claim 4, where cooling fluid is added to the hot side of the heat exchanger to cool the pressurized and processed feed stream.

* * * * *